(12) United States Patent
Nakano et al.

(10) Patent No.: US 8,747,974 B2
(45) Date of Patent: Jun. 10, 2014

(54) POLYESTER RESIN COMPOSITION

(71) Applicant: Mitsubishi Chemical Corporation, Chiyoda-ku (JP)

(72) Inventors: Hiroshi Nakano, Mie (JP); Hiroyuki Kaneko, Mie (JP); Masanobu Miwa, Kanagawa (JP); Atsushi Kusuno, Mie (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 13/957,963

(22) Filed: Aug. 2, 2013

(65) Prior Publication Data

US 2013/0316106 A1 Nov. 28, 2013

Related U.S. Application Data

(63) Continuation of application No. PCT/JP2012/052315, filed on Feb. 1, 2012.

(30) Foreign Application Priority Data

Feb. 2, 2011 (JP) ................................. 2011-020820
Jul. 20, 2011 (JP) ................................. 2011-159398

(51) Int. Cl.
*B29D 22/00* (2006.01)
*C08L 67/02* (2006.01)
*C08L 91/06* (2006.01)

(52) U.S. Cl.
CPC *C08L 67/02* (2013.01); *C08L 91/06* (2013.01)
USPC ........................... 428/35.7; 525/444; 428/35.5

(58) Field of Classification Search
CPC ............. C08L 67/02; B29D 7/00; B29D 7/01
USPC ................ 428/34.1, 35.5, 220, 35.7; 525/444
See application file for complete search history.

(56) References Cited

U.S. PATENT DOCUMENTS

| 7,226,655 | B2 * | 6/2007 | Iriya et al. ..................... 428/220 |
| 7,342,086 | B2 * | 3/2008 | Kato et al. ..................... 528/480 |
| 2004/0086667 | A1 * | 5/2004 | Iriya et al. ..................... 428/34.1 |

FOREIGN PATENT DOCUMENTS

| JP | 2001-500907 | 1/2001 |
| JP | 2003-128900 | 5/2003 |
| JP | 2003-171474 | 6/2003 |
| JP | 2003-284478 | 10/2003 |
| JP | 2005-281677 | 10/2005 |
| WO | 98/12242 | 3/1998 |

OTHER PUBLICATIONS

International Search Report issued Apr. 17, 2012 in PCT/JP2012/052315 filed Feb. 1, 2012.

* cited by examiner

*Primary Examiner* — N. Edwards
(74) *Attorney, Agent, or Firm* — Oblon, Spivak, McClelland, Maier & Neustadt, L.L.P.

(57) ABSTRACT

The present invention relates to a polyester resin composition comprising: (A) a polyester resin containing 5% by mole or more and not more than 86% by mole of a succinic acid unit in the whole of an aliphatic dicarboxylic acid unit; (B) a polyester resin containing 5% by mole or more and not more than 95% by mole of an aromatic dicarboxylic acid unit in all of dicarboxylic acid units; and (C) a polyester resin containing an aliphatic oxycarboxylic acid, wherein the polyester resin composition contains from 10 to 89% by weight of the resin (A) and from 11 to 90% by weight of the resin (B) relative to a total sum of the resins (A) and (B) and contains from 1 to 40% by weight of the resin (C) relative to a total sum of the resins (A), (B) and (C).

7 Claims, No Drawings

POLYESTER RESIN COMPOSITION

TECHNICAL FIELD

The present invention relates to a resin composition containing an aliphatic polyester-based resin, which is capable of providing films having excellent mechanical properties.

BACKGROUND ART

Papers, plastic films, metal foils, and the like have hitherto been used in wide applications inclusive of liquid materials or granular materials for various food products, chemicals, miscellaneous goods, etc., packaging materials of solids, materials for agricultural use, building materials, and the like. In particular, plastic films are excellent in terms of strength, water resistance, formability, transparency, cost, and the like and are used as bags and containers in a lot of applications. Examples of representative plastic films include those constituted of polyethylene, polypropylene, polystyrene, polyvinyl chloride, or the like. However, these resins are hardly degradable under a natural environment, and in the case of performing an incineration treatment, there is involved a problem such as generation of a noxious gas, damaging of an incinerator, etc.

In order to solve the foregoing problem, various resins have been studied. For example, there is known a technique for solving the foregoing problem by using an aliphatic polyester-based resin such as polybutylene succinate, polybutylene succinate adipate, etc., an aliphatic oxycarboxylic acid-based resin such as polylactic acid, etc., or an aromatic-aliphatic copolyester-based resin such as polybutylene adipate terephthalate, etc. (see, for example, Patent Document 1).

In addition, in an aromatic-aliphatic copolyester-based resin such as polybutylene adipate terephthalate, etc., it was known to enhance biodegradability by allowing an aliphatic unit to exist between aromatic units. However, for the purpose of improving flexibility and tensile strength, there is disclosed an aliphatic polyester-based resin composition containing an aliphatic polyester-based resin having excellent crystallinity and formability, an aromatic-aliphatic copolyester-based resin having a low content of an aromatic dicarboxylic acid component, and an aliphatic oxycarboxylic acid-based resin in a prescribed ratio (see, for example, Patent Document 2).

BACKGROUND ART DOCUMENT

Patent Document

Patent Document 1: JP-T-2001-500907
Patent Document 2: JP-A-2005-281677

SUMMARY OF INVENTION

Problem that Invention is to Solve

Though the aliphatic polyester-based resin such as polybutylene succinate, polybutylene succinate adipate, etc. has a fast rate of crystallization and good formability, there was a concern that the film after forming is insufficient in terms of tear strength. In addition, the aliphatic oxycarboxylic acid-based resin such as polylactic acid, etc. is high in terms of rigidity, so that when incorporated into a film, it can be enhanced in terms of film strength. However, there was a concern that the rate of crystallization is slow so that the formability is inferior. In addition, even in the case of utilizing the technology described in Patent Document 1, there was a concern that the rate of crystallization is still slow so that the formability is inferior.

In addition, in the case of forming a film using the aromatic-aliphatic copolyester-based resin, though its flexibility is sufficient, there was a concern that the tensile strength is weak so that a so-called limp film is produced. Even in the case of utilizing the technique described in Patent Document 2, there was a concern that the tear strength of film is inferior, and there was room for improvement of impact strength.

A problem of the present invention is to provide a resin composition which even when formed into a film, is excellent in terms of tear strength and also excellent in terms of impact strength and also a film or a bag obtained by subjecting the resin composition to forming.

Means for Solving Problem

In order to solve the foregoing problem, the present inventor made extensive and intensive investigations. As a result, it has been found that by containing a polyester resin (A), a polyester resin (B), and a polyester resin (C) in a prescribed ratio and also allowing an amount of a succinic acid-originated structural unit in the polyester resin (A) to fall within a prescribed range, a film which is excellent in terms of tear strength and also excellent in terms of impact strength can be obtained.

Specifically, the gist of the present invention is as follows.

[1]
A polyester resin composition, comprising:
(A) a polyester resin that is an aliphatic polyester-based resin containing an aliphatic diol unit and an aliphatic dicarboxylic acid unit, the polyester resin (A) containing 5% by mole or more and not more than 86% by mole of a succinic acid unit in whole of the aliphatic dicarboxylic acid unit;
(B) a polyester resin that is an aromatic-aliphatic copolyester-based resin containing an aliphatic diol unit, an aliphatic dicarboxylic acid unit, and an aromatic dicarboxylic acid unit, the polyester resin (B) containing 5% by mole or more and not more than 95% by mole of the aromatic dicarboxylic acid unit in all of dicarboxylic acid units; and
(C) a polyester resin containing an aliphatic oxycarboxylic acid,
wherein the polyester resin composition contains from 10 to 89% by weight of the polyester resin (A) and from 11 to 90% by weight of the polyester resin (B) relative to a total sum of the polyester resin (A) and the polyester resin (B), and
the polyester resin composition contains from 1 to 40% by weight of the polyester resin (C) relative to a total sum of the polyester resin (A), the polyester resin (B), and the polyester resin (C).

[2]
The resin composition as described in [1] above, wherein the aliphatic dicarboxylic acid unit constituting the polyester resin (A) contains an aliphatic dicarboxylic acid unit having a carbon number of 2 or more and not more than 40.

[3]
The resin composition as described in [1] or [2] above, further comprising: a lubricant.

[4]
The resin composition as described in any one of [1] to [3] above, further comprising: a filler.

[5]
A film, which is obtained by subjecting the resin composition as described in any one of [1] to [4] above to forming.

[6]

A mulch film, which is obtained by subjecting the resin composition as described in any one of [1] to [4] to forming.

[7]

A bag, which is obtained by subjecting the film as described in [5] above to forming.

Effects of Invention

According to the present invention, it is possible to provide a resin composition which is good in terms of formability and which when formed into a film, is not only excellent in terms of tear strength but also excellent in terms of impact strength.

For example, in the case where the resin composition according to the present invention is formed into a film and then formed into a bag, the resulting bag is excellent in terms of tear strength, so that it becomes possible to prevent tear of the bag from occurring. In addition, because of excellent impact strength, on the occasion of opening the bad or on the occasion of filling the bag with goods, it becomes possible to prevent tear of the bag from occurring. Furthermore, a mulch film obtained by subjecting the resin composition according to the present invention to forming is excellent in terms of tear strength, so that it can be suitably used.

MODE FOR CARRYING OUT INVENTION

Though embodiments of the present invention are hereunder described, it should not be construed that the present invention is limited to the following embodiments. The present invention can be carried out through various modifications within the range of the gist thereof.

The polyester resin composition of the present invention contains the following polyester resins (A) to (C). The polyester resin (A) is an aliphatic polyester-based resin containing an aliphatic diol unit and an aliphatic dicarboxylic acid unit, the polyester resin (A) containing 5% by mole or more and not more than 86% by mole of a succinic acid-originated unit in the whole of the aliphatic dicarboxylic acid unit. The polyester resin (B) is an aromatic-aliphatic copolyester-based resin containing an aliphatic diol unit, an aliphatic dicarboxylic acid unit, and an aromatic dicarboxylic acid unit, the polyester resin (B) containing 5% by mole or more and not more than 95% by mole of the aromatic dicarboxylic acid unit in all of the dicarboxylic acid units. The polyester resin (C) is a polyester resin containing an aliphatic oxycarboxylic acid. Furthermore, the polyester resin composition of the present invention contains from 10 to 89% by weight of the polyester resin (A) and from 11 to 90% by weight of the polyester resin (B) relative to a total sum of the polyester resin (A) and the polyester resin (B) and also contains from 1 to 40% by weight of the polyester resin (C) relative to a total sum of the polyester resin (A), the polyester resin (B), and the polyester resin (C).

In the present invention, the aliphatic diol refers to a compound in which two hydroxyl groups are bound to an aliphatic hydrocarbon group. As the aliphatic hydrocarbon group, though a linear aliphatic hydrocarbon group is generally used, it may have a branched structure or may have a cyclic structure, or it may also have a plurality of these structures. In addition, the aliphatic dicarboxylic acid unit refers to a unit in which two carboxyl groups are bound to an aliphatic hydrocarbon group. As the aliphatic hydrocarbon group, though a linear aliphatic hydrocarbon group is generally used, it may have a branched structure or may have a cyclic structure, or it may also have a plurality of these structures.

In addition, the polyester resin according to the present invention is a polymer having repeating units. Each of the repeating units is also called a compound unit relative to a compound which becomes the origin for each of the repeating units. Specifically, for example, the repeating unit originated from the aliphatic diol is also called an "aliphatic diol unit"; the repeating unit originated from the aliphatic dicarboxylic acid is also called an "aliphatic dicarboxylic acid unit"; the repeating unit originated from the aromatic dicarboxylic acid is also called an "aromatic dicarboxylic acid unit"; and the repeating unit originated from the aliphatic oxycarboxylic acid is also called an "aliphatic oxycarboxylic acid unit".

1. Polyester Resin Composition

The resin composition of the present invention is a polyester resin composition characterized by containing specified amounts of the polyester resin (A), the polyester resin (B), and the polyester resin (C), wherein the polyester resin composition contains from 10 to 89% by weight of the polyester resin (A) and from 11 to 90% by weight of the polyester resin (B) relative to a total sum of the polyester resin (A) and the polyester resin (B) and contains from 1 to 40% by weight of the polyester resin (C) relative to a total sum of the polyester resin (A), the polyester resin (B), and the polyester resin (C).

As for the content ratio of the polyester resin (A) and the polyester resin (B), in general, the polyester resin composition contains from 10 to 89% by weight of the polyester (A) and from 11 to 90% by weight of the polyester (B) relative to a total sum of the polyester resin (A) and the polyester resin (B). By containing the polyester resin (A) and the polyester resin (B) in such a ratio, in the case of forming a film using the polyester resin composition of the present invention, it is possible to allow the film to have excellent formability, impact strength and tear strength. In addition, since it is possible to make these physical properties more excellent, the content ratio of the polyester resin (A) is preferably 40% weight or more, more preferably 51% by weight or more, and especially preferably 61% by weight or more. In addition, for the same reason, the content ratio of the polyester resin (B) is preferably 15% by weight or more, more preferably 18% by weight or more, and especially preferably 20% by weight or more.

In addition, in the case of forming a film using the resin composition according to the present invention, since it is possible to make the tear strength of the film or the impact strength of the film more excellent, in general, the resin composition contains from 1 to 40% by weight of the polyester resin (C) relative to a total sum of the polyester resin (A), the polyester resin (B), and the polyester resin (C). The resin composition contains preferably from 3 to 35% by weight, and more preferably from 6 to 30% by mass of the polyester resin (C).

The polyester resin composition of the present invention may contain various compounds other than the polyester resin (A), the polyester resin (B), and the polyester resin (C). These other constituent components are described later.

1.1. Polyester Resin (A)

The polyester resin (A) which is used in the present invention is an aliphatic polyester-based resin containing an aliphatic diol unit and an aliphatic dicarboxylic acid unit, the polyester resin (A) containing 5% by mole or more and not more than 86% by mole of a succinic acid-originated unit in the whole of the aliphatic dicarboxylic acid unit. The polyester resin (A) may be a mixture of polyester resins having a different amount of the succinic acid unit from each other, and for example, it is also possible to use a mixture obtained by blending an aliphatic polyester-based resin not containing a dicarboxylic acid structural unit other than a succinic acid-originated structural unit and an aliphatic polyester-based resin containing a structural unit other than a succinic acid-originated structural unit and adjusting the blend so as to allow the amount of the succinic acid-originated structural unit in the polyester resin (A) to fall within the above-described prescribed range.

More specifically, the polyester resin (A) is a polyester resin containing an aliphatic diol unit represented by the following formula (1) and an aliphatic dicarboxylic acid unit represented by the following formula (2).

  (1)

  (2)

In the formula (1), $R^1$ represents a divalent aliphatic hydrocarbon group. In the case where the polyester resin (A) is a copolymer, two or more kinds of aliphatic diol units represented by the formula (1) may be contained in the polyester resin (A). In the formula (2), $R^2$ represents a divalent aliphatic hydrocarbon group. Though the aliphatic diol unit and aliphatic dicarboxylic acid unit represented by the foregoing formulae (1) and (2) may be those originated from a compound which is derived from petroleum or those originated from a compound which is derived from a plant raw material, it is desirable that a compound derived from a plant raw material is included. In the case where the polyester resin (A) is a copolymer, two or more kinds of aliphatic dicarboxylic acid units represented by the formula (2) may be contained in the polyester resin (A). Then, the aliphatic dicarboxylic acid unit represented by the formula (2) contains the succinic acid-originated structural unit in an amount of 5% by mole or more and not more than 86% by mole relative to the whole of the aliphatic dicarboxylic acid unit. By allowing the amount of the succinic acid-originated structural unit in the polyester resin (A) to fall within the prescribed range, it becomes possible to obtain a film which is enhanced in terms of tear strength and is also excellent in terms of impact strength. Then, for the same reason, the succinic acid-originated structural unit is contained in an amount of preferably 10% by mole or more, more preferably 50% by mole or more, still more preferably 64% by mole or more, and especially preferably 68% by mole or more, and preferably not more than 83% by mole, more preferably not more than 81% by mole, and especially preferably not more than 79% by mole, relative to the whole of the aliphatic dicarboxylic acid unit.

Though an aliphatic diol capable of giving the diol unit of the formula (1) is not particularly limited, from the viewpoints of formability and mechanical strength, an aliphatic diol having the carbon number of 2 or more and not more than 10 is preferable, and an aliphatic diol having the carbon number of 4 or more and not more than 6 is especially preferable. Examples thereof include ethylene glycol, 1,3-propanediol, 1,4-butanediol, 1,4-cyclohexanedimethanol, and the like. Above all, 1,4-butanediol is especially preferable. Incidentally, two or more kinds of the above-described aliphatic diols can be used, respectively.

Though a dicarboxylic acid component capable of giving the dicarboxylic acid unit of the formula (2) is not particularly limited, an aliphatic dicarboxylic acid having the carbon number of 2 or more and not more than 40 is preferable, and an aliphatic dicarboxylic acid having the carbon number of 4 or more and not more than 10 is especially preferable. Examples thereof include adipic acid, suberic acid, sebacic acid, dodecane diacid, a dimer acid, and the like. Above all, adipic acid or sebacic acid is preferable, and adipic acid is especially preferable. Incidentally, two or more kinds of the above-described dicarboxylic acids can be used, respectively.

Furthermore, the polyester resin (A) in the present invention may have a repeating unit originated from an aliphatic oxycarboxylic acid (aliphatic oxycarboxylic acid unit). Specific examples of the aliphatic oxycarboxylic acid capable of giving an aliphatic oxycarboxylic acid unit include lactic acid, glycolic acid, 2-hydroxy-n-butyric acid, 2-hydroxycaproic acid, 6-hydroxycaproic acid, 2-hydroxy-3,3-dimethylbutyric acid, 2-hydroxy-3-methylbutyric acid, 2-hydroxyisocaproic acid, and the like; and also lower alkyl esters or intramolecular esters thereof. In the case where an optical isomer is present therein, any of a D-isomer, an L-isomer, and a racemic isomer may be useful, and its form may be a solid, a liquid, or an aqueous solution. Of these, lactic acid or glycolic acid is especially preferable. These aliphatic oxycarboxylic acids can be used either solely or in admixture of two or more kinds thereof.

From the viewpoint of formability, the amount of the aliphatic oxycarboxylic acid is preferably not more than 20% by mole, more preferably not more than 10% by mole, and especially preferably not more than 5% by mole in all of the repeating units constituting the polyester resin (A).

In addition, the polyester resin (A) in the present invention may be a polyester resin whose melt viscosity is increased through copolymerization with "a trifunctional or more aliphatic polyhydric alcohol", "a trifunctional or more aliphatic polyvalent carboxylic acid or its acid anhydride", or "a trifunctional or more aliphatic polyvalent oxycarboxylic acid", or a polyester resin having been subjected to chain extension with a coupling agent.

Specific examples of the trifunctional aliphatic polyhydric alcohol include trimethylolpropane, glycerin, and the like, and specific examples of the tetrafunctional aliphatic polyhydric alcohol include pentaerythritol and the like. These can be used either solely or in admixture of two or more kinds thereof.

Specific examples of the trifunctional aliphatic polyvalent carboxylic acid or its acid anhydride include propanetricarboxylic acid or its acid anhydride. Specific examples of the tetrafunctional aliphatic polyvalent carboxylic acid or its acid anhydride include cyclopentanetetracarboxylic acid or its acid anhydride, and the like. These can be used either solely or in admixture of two or more kinds thereof.

In addition, the trifunctional aliphatic polyvalent oxycarboxylic acid is classified into (i) a type having two carboxyl groups and one hydroxyl group in the same molecule and (ii) a type having one carboxyl group and two hydroxyl groups in the same molecule, and all of these types can be used. However, from the viewpoints of formability, mechanical strength, and appearance of a formed article, the type (i) having two carboxyl groups and one hydroxyl group in the same molecule, such as malic acid, etc., is preferable, and more specifically, malic acid is preferably used. In addition, the tetrafunctional aliphatic polyvalent oxycarboxylic acid component is classified into (i) a type having three carboxyl groups and one hydroxyl group together in the same molecule, (ii) a type having two carboxyl groups and two hydroxyl groups together in the same molecule, and (iii) a type having three hydroxyl groups and one carboxyl group together in the same molecule, and all of these types can be used. However, those having plural carboxyl groups are preferable, and more specifically, examples thereof include citric acid, tartaric acid, and the like. These can be used either solely or in admixture of two or more kinds thereof.

As for the amount of the structural unit originated from such a trifunctional or more component, a lower limit thereof is generally 0% by mole or more, and preferably 0.01% by mole or more, and an upper limit thereof is generally not more than 5% by mole, and preferably not more than 2.5% by mole, based on 100% by mole of all of the constitutional units constituting the polyester resin (A).

Examples of the coupling agent include diisocyanates, oxazolines, diepoxy compounds, acid anhydrides, and the like. Specifically, examples thereof include 2,4-tolylene diisocyanate, diphenylmethane diisocyanate, 1,5-naphthylene diisocyanate, hydrogenated xylylene diisocyanate, hexamethylene diisocyanate, and the like. The addition amount of such a coupling agent is from 0.1 to 5 parts by weight based on 100 parts by weight of the polyester resin (A).

The polyester resin (A) essentially has the succinic acid-originated structural unit and has the above-described structural unit originated from a dicarboxylic acid component other than succinic acid or the above-described structural unit originated from a diol component, and also arbitrarily has the above-described structural unit originated from a polyhydric alcohol component, the above-described structural unit originated from a polyvalent carboxylic acid component, the structural unit originated from an aliphatic oxycarboxylic acid component, or the coupling agent.

The polyester resin (A) which is used in the present invention can be produced by a known method. For example, the polyester resin (A) can be produced by a general method of melt polymerization in which after performing an esterification reaction and/or an ester exchange reaction between the aliphatic dicarboxylic acid containing succinic acid and the aliphatic diol as described above, a polycondensation reaction is performed under reduced pressure, or a known solution heating dehydration condensation method using an organic solvent. However, from the viewpoint of profitability and simplicity of the production process, a method of producing the polyester resin (A) by melt polymerization which is performed in the absence of a solvent is preferable.

An average molecular weight of the polyester resin (A) can be measured by means of gel permeation chromatography (GPC), and a weight average molecular weight thereof as reduced into polystyrene as a standard substance is generally 10,000 or more and not more than 1,000,000. However, because of advantages in view of formability and mechanical strength, the weight average molecular weight is preferably 20,000 or more and not more than 500,000, and more preferably 50,000 or more and not more than 400,000.

When measured at 190° C. and 2.16 kg, a melt flow rate (MFR) of the polyester resin (A) is generally 0.1 g/10 min or more and generally not more than 100 g/10 min. From the viewpoints of formability and mechanical strength, the melt flow rate is preferably not more than 50 g/10 min, and especially preferably not more than 30 g/10 min.

A melting point of the polyester resin (A) is preferably 70° C. or higher, and more preferably 75° C. or higher, and preferably not higher than 170° C., more preferably not higher than 119° C., and especially preferably lower than 100° C. In the case where plural melting points are present, it is preferable that at least one melting point falls within the foregoing range. An elastic modulus is preferably from 180 to 500 MPa. When the melting point falls outside the foregoing range, the formability is inferior. When the elastic modulus is less than 180 MPa, a problem in formability or bag-making properties is caused easily, whereas when the elastic modulus is more than 500 MPa, an improving effect in tear strength or impact strength is hardly obtainable. Though a method of adjusting the melting point or elastic modulus of the polyester resin (A) is not particularly limited, it is possible to adjust it by, for example, selecting the kind of a copolymerization component other than succinic acid, adjusting the respective copolymerization ratios, or combining them.

1.2. Polyester Resin (B)

The polyester resin (B) which is used in the present invention is an aromatic-aliphatic copolyester-based resin containing an aliphatic diol unit, an aliphatic dicarboxylic acid unit, and an aromatic dicarboxylic acid unit. Specifically, for example, the polyester resin (B) is preferably a resin containing, as a major component, an aromatic-aliphatic copolyester composed of an aliphatic diol unit represented by the following formula (3), an aliphatic dicarboxylic acid unit represented by the following formula (4), and an aromatic dicarboxylic acid unit represented by the following formula (5), and it is preferable that the polyester resin (B) has biodegradability.

$$-O-R^3-O- \quad (3)$$

In the formula (3), $R^3$ represents a divalent aliphatic hydrocarbon group. In the case where the polyester resin (B) is a copolymer, two or more kinds of $R^3$ may be contained in the polyester resin (B).

$$-OC-R^4-CO- \quad (4)$$

In the formula (4), $R^4$ represents a divalent aliphatic hydrocarbon group. In the case where the polyester resin (B) is a copolymer, two or more kinds of $R^4$ may be contained in the polyester resin (B).

$$-OC-R^5-CO- \quad (5)$$

In the formula (5), $R^5$ represents a divalent aromatic hydrocarbon group. In the case where the polyester resin (B) is a copolymer, two or more kinds of $R^5$ may be contained in the polyester resin (B).

Though a diol capable of giving the diol unit of the formula (3) is not particularly limited, a diol having the carbon number of 2 or more and not more than 10 is preferable from the standpoint of a balance between cost and mechanical strength. Examples thereof include ethylene glycol, 1,3-propanediol, 1,4-butanediol, 1,4-cyclohexanedimethanol, and the like. Above all, a diol having the carbon number of 2 or more and not more than 4 is preferable, ethylene glycol or 1,4-butanediol is more preferable, and 1,4-butanediol is especially preferable.

Though a dicarboxylic acid capable of giving the dicarboxylic acid unit of the formula (4) is not particularly limited, a dicarboxylic acid having the carbon number of 2 or more and not more than 12 is preferable from the standpoint of a balance between cost and biodegradability. Examples thereof include succinic acid, adipic acid, suberic acid, sebacic acid, dodecane diacid, and the like. Above all, sebacic acid or adipic acid is preferable.

As for an aromatic dicarboxylic acid capable of giving the aromatic dicarboxylic acid unit of the formula (5), it is preferable that the number of the ring structure of $R^5$ is not more than 2. More specifically, examples thereof include terephthalic acid, isophthalic acid, naphthalenedicarboxylic acid, and the like. Above all, from the viewpoint of degradability, $R^5$ is preferably a phenylene group. More specifically, for example, terephthalic acid or isophthalic acid is preferable, and terephthalic acid is especially preferable. In addition, the aromatic dicarboxylic acid may also be an aromatic dicarboxylic acid in which a part of the aromatic ring thereof is substituted with a sulfonic acid salt.

Incidentally, each of the aliphatic dicarboxylic acid, the aliphatic diol, and the aromatic dicarboxylic acid can also be used in combination of two or more kinds thereof.

The polyester resin (B) may have an aliphatic oxycarboxylic acid unit. Specific examples of an aliphatic oxycarboxylic acid capable of giving the aliphatic oxycarboxylic acid unit include lactic acid, glycolic acid, 2-hydroxy-n-butyric acid, 2-hydroxycaproic acid, 6-hydroxycaproic acid, 2-hydroxy-3,3-dimethylbutyric acid, 2-hydroxy-3-methylbutyric acid, 2-hydroxyisocaproic acid, and mixtures thereof, and the like. Furthermore, lower alkyl esters or intramolecular esters thereof may also be useful. In the case where an optical isomer is present therein, any of a D-isomer, an L-isomer, and a racemic isomer may be useful, and its form may be a solid, a liquid, or an aqueous solution. Of these, lactic acid or glycolic acid is preferable. These aliphatic oxycarboxylic acids can be used either solely or in admixture of two or more kinds thereof.

The amount of this aliphatic oxycarboxylic acid is preferably not more than 20% by mole, and more preferably not more than 10% by mole in all of the constituent components constituting the polyester resin (B).

In addition, similar to the polyester resin (A), the polyester resin (B) may be a polyester resin whose melt viscosity is increased through copolymerization with "a trifunctional or more aliphatic polyhydric alcohol", "a trifunctional or more aliphatic polyvalent carboxylic acid or its acid anhydride", or "a trifunctional or more aliphatic polyvalent oxycarboxylic acid", or a polyester resin having been subjected to chain extension with a coupling agent such as a diisocyanate, a diepoxy compound, etc.

From the viewpoints of melting point and biodegradability, the content of the aromatic dicarboxylic acid unit in the polyester resin (B) is preferably 5% by mole or more, more preferably 35% by mole or more, and especially preferably 40% by mole or more, and preferably not more than 95% by mole, more preferably not more than 65% by mole, and especially preferably not more than 60% by mole, relative to a total sum (100% by mole) of the aliphatic dicarboxylic acid unit and the aromatic dicarboxylic acid unit.

Similar to the polyester resin (A), the polyester resin (B) can be produced by a known production method.

An average molecular weight of the polyester resin (B) can be measured by means of gel permeation chromatography (GPC), and a weight average molecular weight thereof as reduced into polystyrene as a standard substance is generally 5,000 or more and not more than 1,000,000. However, because of advantages in view of formability and mechanical strength, the weight average molecular weight is preferably 10,000 or more and not more than 500,000.

As for a melt flow rate (MFR) of the polyester resin (B) which is used in the present invention, when measured at 190° C. and 2.16 kg, a lower limit thereof is generally 0.1 g/10 min or more, and in general, an upper limit thereof is preferably not more than 100 g/10 min, more preferably not more than 50 g/10 min, and especially preferable not more than 30 g/10 min. It is possible to adjust the melt flow rate (MFR) of the polyester resin (B) by a molecular weight.

A melting point of the polyester resin (B) is preferably 70° C. or higher, and more preferably 75° C. or higher, and preferably not higher than 205° C., more preferably not higher than 180° C., and especially preferably not higher than 140° C. When the melting point is lower than 70° C., the composition is inferior in terms of formability and heat resistance, whereas when the melting point is higher than 205° C., a difference in the melting point from other component becomes large, so that the composition is inferior in terms of formability. It is possible to adjust the melting point of the polyester resin (B) by the amount of the aromatic dicarboxylic acid or the amount of the oxycarboxylic acid.

1.3. Polyester Resin (C)

The polyester resin (C) which is used in the present invention contains, as a major component, a polyester resin composed of an aliphatic oxycarboxylic acid unit.

Examples of the aliphatic oxycarboxylic acid capable of giving the aliphatic oxycarboxylic acid unit include lactic acid, glycolic acid, 2-hydroxy-n-butyric acid, 3-hydroxybutyric acid, 4-hydroxybutyric acid, 4-hydroxyvaleric acid, 5-hydroxyvaleric acid, 2-hydroxycaproic acid, 6-hydroxycaproic acid, 3-hydroxyhexanoic acid, 2-hydroxy-3,3-dimethylbutyric acid, 2-hydroxy-3-methylbutyric acid, 2-hydroxyisocaproic acid, and the like; and also lower alkyl esters or intramolecular esters thereof. In the case where an optical isomer is present therein, any of a D-isomer, an L-isomer, and a racemic isomer may be useful, and its form may be a solid, a liquid, or an aqueous solution. Of these, lactic acid or glycolic acid is especially preferable, and lactic acid is the most preferable. These aliphatic oxycarboxylic acids can be used either solely or in admixture of two or more kinds thereof.

In addition, the polyester resin (C) may have an aliphatic oxycarboxylic acid unit originated from a trifunctional or more aliphatic polyvalent oxycarboxylic acid component. The trifunctional aliphatic polyvalent oxycarboxylic acid component is classified into (i) a type having two carboxyl groups and one hydroxyl group in the same molecule and (ii) a type having one carboxyl group and two hydroxyl groups in the same molecule, and all of these types can be used. However, from the viewpoint of reducing coloration of the polyester resin (C) or extraneous matters to increase the quality, the type (i) having two carboxyl groups and one hydroxyl group in the same molecule, such as malic acid, etc., is preferable, and more specifically, malic acid or the like is preferably used. In addition, the tetrafunctional aliphatic polyvalent oxycarboxylic acid component is classified into (i) a type having three carboxyl groups and one hydroxyl group together in the same molecule, (ii) a type having two carboxyl groups and two hydroxyl groups together in the same molecule, and (iii) a type having three hydroxyl groups and one carboxyl group together in the same molecule, and all of these types can be used. Specifically, examples thereof include citric acid, tartaric acid, and the like. These can be used either solely or in admixture of two or more kinds thereof.

The polyester resin (C) may contain a structural unit other than those originated from the aliphatic polyester or aromatic-aliphatic polyester as described above. As for the content of other structural unit in the polyester resin (C), a lower limit thereof is generally 0% by mole or more, and preferably 0.01% by mole or more, and an upper limit thereof is generally not more than 5% by mole, and preferably not more than 2.5% by mole, relative to 100% by mole of a total sum of the structural unit originated from an aliphatic oxycarboxylic acid and other structural unit.

The polyester resin (C) may be obtained by a method of subjecting the above-described raw materials to direct dehydration polycondensation, a method of subjecting a cyclic dimer of lactic acid or a hydroxycarboxylic acid to ring-opening polymerization, production by microorganisms, or the like.

As for a melt flow rate (MFR) of the polyester resin (C) which is used in the present invention, when measured at 190° C. and 2.16 kg, a lower limit thereof is generally 0.1 g/10 min or more, and an upper limit thereof is generally not more than 100 g/10 min, preferably not more than 50 g/10 min, and especially preferable not more than 30 g/10 min.

1.4. Other Components

The resin composition according to the present invention may contain, as "other components", various additives such as a lubricant, a filler (filling agent), a plasticizer, an antistatic agent, an antioxidant, a light stabilizer, an ultraviolet ray absorber, a dye, a pigment, a hydrolysis inhibitor, etc.; synthetic resins such as polycaprolactone, polyamides, polyvinyl alcohol, cellulose esters, etc.; animal/plant material fine powders such as starch, cellulose, paper, wood powder, chitin or chitosan, palm shell powder, walnut shell powder, etc.; or mixtures thereof. These can be arbitrarily used within the range where the effects of the present invention are not impaired. These may be used solely, or may also be used in admixture of two or more kinds thereof. In general, for the purpose of not impairing physical properties of the biodegradable resin composition, the addition amount of such an additive is preferably 0.01% by weight or more and not more than 40% by weight in terms of a total amount of the materials to be mixed relative to a total amount of the biodegradable resin composition.

1.4.1. Lubricant

For example, when a lubricant is contained in the resin composition according to the present invention, on the occasion of forming the resin composition into a film and then forming it into a bag, the formability can be enhanced. In addition, a mouth of the bag can be made opened easily, so that the usability of the bag can be enhanced. Furthermore, when the mouth of the bag is made opened easily, the inspection at the time of bag production becomes easy.

As the lubricant, known lubricants can be used without particular limitations. Specifically, examples thereof include paraffins such as paraffin oil, solid paraffin, etc.; higher fatty acids such as stearic acid, palmitic acid, etc.; higher alcohols such as palmityl alcohol, stearyl alcohol, etc.; metal salts of fatty acids such as calcium stearate, zinc stearate, barium stearate, aluminum stearate, magnesium stearate, sodium palmitate, etc.; fatty acid esters such as butyl stearate, glycerin monostearate, diethylene glycol monostearate, etc.; fatty acid amides such as stearamide, methylene bisstearamide, ethylene bisstearamide, ethylene diamide of oxystearic acid, methylolamide, oleylamide, stearic acid amide, erucic acid amide, etc.; waxes such as carnauba wax, montan wax, etc.; and the like. Incidentally, the lubricants or waxes may be used solely, or may also be used in combination of two or more kinds thereof in an arbitrary ratio and combination. Above all, erucic acid amide is especially preferable. Such a lubricant is generally used in the range of from 0.01 to 2% by weight, and preferably used in the range of from 0.05 to 0.5% by weight in the resin composition.

1.4.2. Filler

When a filler is contained in the resin composition according to the present invention, it is possible to contribute to stabilization at the time of film forming by improving the fluidity and crystallization rate of the resin composition and reduction of anisotropy of mechanical physical properties of a film. In addition, in the case of forming the resin composition into a film, it is possible to prevent blocking between the films from occurring. Alternatively, in the case of forming the film into a bag, it is also possible to make a mouth of the bag opened easily. Furthermore, it is also possible to enhance light-shielding properties or light reflection properties by coloring the film or bag.

The filler includes a fibrous filler, a granular filler, a platy filler, and an acicular filler depending upon the shape thereof, with a granular filler or a platy filler being especially preferable. Examples of the granular filler include particles of minerals such as talc, zeolite, diatomaceous earth, kaolin, clay, silica, quartz powder, etc.; particles of metal carbonates such as calcium carbonate, magnesium carbonate, heavy calcium carbonate, etc.; particles of metal silicates such as calcium silicate, aluminum silicate, magnesium silicate, etc.; particles of metal oxides such as alumina, silica, zinc oxide, titanium oxide, etc.; particles of metal hydroxides such as aluminum hydroxide, calcium hydroxide, magnesium hydroxide, etc.; particles of metal sulfates such as barium sulfate, calcium sulfate, etc.; particles of carbon such as carbon black, etc.; and the like. In addition, examples of the platy filler include mica. From the viewpoints of making a mouth of the bag opened easily and also preventing blocking from occurring, talc, calcium carbonate, or silica may be useful; and from the viewpoints of coloring the film or bag and also enhancing the light-shielding properties or light reflection properties, carbon black or titanium oxide may be useful. As for the dispersed state of the filler in a formed material such as a film, etc. or the resin composition, its number average particle diameter is preferably from 0.08 to 25 μm, and more preferably from 0.1 μm to 5 μm. When the number average particle diameter falls outside this range, the addition effect of the filler becomes low. The filler may be used solely, or may also be used in admixture of two or more kinds thereof. Such a filler is generally used in the range of from 0.05 to 40% by weight in the resin composition.

In the present invention, a surface-treated filler may be used as the filler. In that case, it is possible to achieve an enhancement of dispersibility of the filler and an enhancement of fluidity of the resin composition, and when formed into a film, it is possible to achieve an enhancement of smoothness and an enhancement of mouth opening properties. Furthermore, by performing the surface treatment, a reduction of the additive to be blended in the resin composition, such as a plasticizer, etc., can be expected. As for a surface treatment method of the filler, it is general to mix the filler with a surface treating agent by a generally known method, and the treatment method is not limited. As for the kind of the surface treating agent, examples thereof include linear fatty acids or branched chain fatty acids each having the carbon number of 6 or more and not more than 40, and esterified compounds thereof, and the like.

Though the particle diameter of the filler to be used is not particularly limited, for the reasons of an enhancement of film physical properties and handling, it is preferably 0.5 μm or more, more preferably 0.6 μm or more, and still more preferably 0.7 μm or more in terms of an average particle diameter. In addition, for the reason of an enhancement of film physical properties, the average particles size is preferably not more than 7 μm, more preferably not more than 2 and still more preferably not more than 1.0 μm. Though a measuring method of the average particle diameter is not particularly limited, as for a specific example of the measuring method, a specific surface area value per gram of a powder measured with a powder specific surface area analyzer, SS-100 Model, manufactured by Shimadzu Corporation (constant pressure air permeability method) is determined, and the average particle diameter of the filler is calculated according to the following equation from the measurement results of the specific surface area by the air permeability method in conformity of JIS M-8511.

$$\text{Average particle diameter} = \{6/(\text{specific gravity}) \times (\text{specific gravity area})\} \times 10000$$

In addition, when an acicular filler is used, as for an aspect ratio thereof, in general, an upper limit thereof is not more than 1,000, and a lower limit thereof is 1 or more; and preferably, the upper limit is not more than 500, and the lower limit is 10 or more. Most preferably, the upper limit is not more than 100, and the lower limit is 15 or more. When this ratio is too low, there is a tendency that expected physical properties such rigidity, heat resistance, etc. are not revealed; whereas when this ratio is too high, there is a tendency that appearance failure is caused, or the film physical properties are lowered. The aspect ratio as referred to herein means a ratio of a long diameter and a short diameter of the filler. The aspect ratio of the particle is defined to be an arithmetic average value of a ratio of the longest diameter and the shortest diameter of at least 10 or more particles observed in an electron microscopic photograph with a field of view of 100 μm×100 μm.

Though a measuring method of the volume average particle diameter is not particularly limited, the particles dispersed in a dispersion medium can be measured by the sedimentation method, measured by means of laser scattering analysis, or measured by the laser Doppler method. More specifically, the volume average particle diameter is defined to be a value measured on the basis of a sedimentation rate of the particles (Stokes' Law) by a centrifugal sedimentation particle size distribution analyzer, SA-CP4L, manufactured by Shimadzu Corporation and a particle size distribution automatic analyzer, RS-1000, manufactured by Shimadzu Corporation.

Though a hardness of the filler to be used is not particularly limited, when the hardness is too low, there is a tendency that physical properties such rigidity, heat resistance, etc. are lowered, whereas when the hardness is too high, there is a tendency that appearance failure or a lowering of physical properties of the film strength is caused easily. Thus, it is preferable that the hardness is neither too high nor not too low. As for the hardness (Mohs hardness) of the filler to be used, preferably, an upper limit thereof is not more than 9, and a lower limit thereof is 1 or more; more preferably, the upper limit is not more than 8, and the lower limit is 2 or more; and especially preferably, the upper limit is not more than 7, and the lower limit is 3 or more. The Mohs hardness as referred to herein means a value determined by rubbing a standard material by a sample material and measuring the hardness by the presence or absence of a scratch. The standard material is as follows. Hardness 1) talc; hardness 2) gypsum; hardness 3) calcite; hardness 4) fluorite; hardness 5) apatite; hardness 6) orthoclase; hardness 7) crystal; hardness 8) topaz; hardness 9) corundum; and hardness 10) diamond.

More specifically, it is possible to use, as the filler, talc, calcium carbonate, silica, titanium oxide, barium sulfate, or the like. For example, examples of the talc include LMS100, LMR100, PKP80, and PKP53S, all of which are manufactured by Fuji Talc Industrial Co., Ltd. Examples of the calcium carbonate include NITOREX 30P, NITOREX 23P, NS #100, and NCC series inclusive of NITOREX3OPS, NCC #2310, NCC #1010, NCC-V2300, and NCC-V1000, all of which are manufactured by Nitto Funka Kogyo K.K.; WHIS-CAL A, manufactured by Maruo Calcium Co., Ltd.; and the like. Examples of the silica particle include AEROSIL 200 and AEROSIL 300, all of which are manufactured by Nippon Aerosil Co., Ltd.; and the like. As the titanium oxide, CR-60, CR-80, and CR-68, all of which are manufactured by Ishihara Sangyo Kaisha, Ltd., can be used.

1.4.3. Plasticizer

Incidentally, in the case where flowability of the resin composition is poor, a plasticizer may be added. In particular, in the case where the filler is contained in the resin composition, there is a concern that the viscosity of the resin composition increases, so that the flowability of the resin composition becomes poor. By adding a plasticizer to the resin composition, it is possible to improve this matter.

As the plasticizer, known plasticizers can be used without particular limitations. Examples thereof include fatty acid esters such as methyl adipate, diethyl adipate, diisopropyl adipate, di-n-propyl adipate, di-2-ethylhexyl adipate, diisobutyl adipate, dibutyl adipate, diisodecyl adipate, dibutyl diglycol adipate, di-2-ethylhexyl azelate, dibutyl sebacate, di-2-ethylhexyl sebacate, methyl acetyl ricinoleate, etc.; glycerin esters such as triacetin, etc.; maleic acid and fumaric acid esters such as diethyl maleate, dibutyl maleate, dioctyl maleate, dibutyl fumarate, dioctyl fumarate, etc.; polyesters or epoxidized esters such as adipic acid-1,3-butylene glycol, epoxidized soybean oil, etc.; trimellitic acid esters such as trioctyl trimellitate, etc.; acetylated monoglycerides such as triethylene glycol diacetate, tributyl acetylcitrate, glycerin diacetomonopropionate, glycerin diacetomonocaprylate, glycerin diacetomonocaprate, glycerin diacetomonolaurate, glycerin diacetomonooleate, glycerin monoacetomonobehenate, glycerin monoacetomonostearate, etc.; polyglycerin fatty acid esters such as diglycerin acetate, decaglycerin propionate, tetraglycerin caprylate, decaglycerin laurate, decaglycerin oleate, decaglycerin behenate, etc.; rosin derivatives; and the like. Such a plasticizer is generally used in an amount ranging from 0.05 to 10% by weight in the resin composition.

1.4.4. Antistatic Agent

In addition, when an antistatic agent is contained in the resin composition according to the present invention, in the case of forming the resin composition into a film and then forming it into a bag, the formability can be enhanced. In addition, handling of the film or resin becomes easy, too. Any arbitrary antistatic agents can be used so long as the effects of the present invention are not remarkably impaired. As specific examples thereof, nonionic, cationic, or anionic antistatic agents of a surfactant type are preferable.

Examples of the nonionic antistatic agent include glycerin fatty acid esters, polyoxyethylene alkyl ethers, polyoxyethylene alkylphenyl ethers, alkyl diethanolamines, hydroxyalkyl monoethanolamines, polyoxyethylene alkylamines, polyoxyethylene alkylamine fatty acid esters, alkyl diethanolamides, and the like. Above all, alkyl diethanolamines or the like are preferable.

Examples of the cationic antistatic agent include tetraalkylammonium salts, trialkylbenzylammonium salts, and the like. Examples of the anionic antistatic agent include alkylsulfonic acid salts, alkylbenzenesulfonic acid salts, alkyl phosphates, and the like. Above all, alkylbenzenesulfonic acid salts are preferable. This is because the alkylbenzenesulfonic acid salts are good in terms of kneading properties with the resin and high in terms of an antistatic effect.

So long as the effects of the present invention are not remarkably impaired, the use amount of the antistatic agent is arbitrary, but it is generally 0.5% by weight or more, and preferably 1% by weight or more, and generally not more than 5% by weight, and preferably not more than 3% by weight, relative to the biodegradable resin composition. When the use amount of the antistatic agent exceeds the foregoing range, there is a tendency that the surface of the biodegradable resin composition further becomes tacky, so that its commercial value is lowered. In addition, when the use amount of the antistatic agent is less than the foregoing range, there is a tendency that the effect for enhancing antistatic properties is reduced.

1.4.5. Other Additives

Specifically, examples of starch include corn starch, waxy corn starch, high amylose corn starch, wheat starch, rice starch, potato starch, sweet potato starch, tapioca starch, pea starch, and the like. These can be used in any form of an unmodified product or a modified product. The modification includes all of modification methods such as chemical, physical or biological modification, etc. The chemical modification refers to modification of a part or the whole of the constituent units of a carbohydrate (polysaccharide) by a chemical reaction such as esterification, etherification, oxidation, reduction, coupling, dehydration, hydrolysis, dehydrogenation, halogenation, etc. and in particular, refers to etherification or esterification of a hydroxyl group. In addition, the physical modification refers to change of physical properties such as change of a degree of crystallization, etc. In addition, the biological modification refers to change of a chemical structure using an organism, or the like.

Examples of a light fastness agent include hindered amine-based stabilizers such as decane diacid bis(2,2,6,6,-tetramethyl-1(octyloxy)-4-piperidinyl)ester, a reaction product of 1,1-dimethylethylhydroperoxide and octane, bis(1,2,2,6,6-pentamethyl-4-piperidyl)[[3,5-bis(1,1-dimethylethyl)-4-hydroxyphenyl]methyl]butyl malonate, bis(1,2,2,6,6-pentamethyl-4-piperidyl)sebacate, methyl 1,2,2,6,6-pentamethyl-4-piperidyl sebacate, bis(2,2,6,6,-tetramethyl-4-piperidyl)sebacate, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, poly[[6-(1,1,3,3-tetramethylbutyl)amino-1,3,5-triazine-2,4-diyl]][(2,2,6,6-tetramethyl-4-piperidyl)imino]hexamethylene{(2,2,6,6-tetramethyl-4-piperidyl)imino}], etc.; and the like. The light fastness agent is preferably used in combination with an ultraviolet ray absorber, and a combination of the hindered amine-based stabilizer with the ultraviolet ray absorber is effective.

The amount of the light fastness agent to be mixed is generally 100 ppm or more, and preferably 200 ppm or more on a weight basis, and generally not more than 5 parts by weight, preferably not more than 1 part by weight, and more preferably not more than 0.5 parts by weight, relative to the biodegradable resin composition. When the amount of the light fastness agent is less than this range, there is a tendency that the effect of the light fastness agent becomes small. In addition, when the amount of the light fastness agent exceeds this range, there is a tendency that the production cost becomes high, and also, there is a tendency that the heat resistance of the biodegradable resin composition is inferior, or bleed-out of the light fastness agent is caused.

Examples of the ultraviolet ray absorber include 2-(2H-benzotriazol-2-yl)-4,6-bis(1-methyl-1-phenylethyl)phenol, 2-(4,6-diphenyl-1,3,5-triazin-2-yl)-5-[(hexyl)oxy]phenol, and the like. As for the ultraviolet ray absorber, in particular, it is preferable to use a combination of two or more different kinds of ultraviolet ray absorbers.

So long as the effects of the present invention are not remarkably impaired, the amount of the ultraviolet ray absorber to be mixed is arbitrary, but it is generally 100 ppm or more, and preferably 200 ppm or more on a weight basis, and generally not more than 5% by weight, preferably not more than 2% by weight, and more preferably not more than 0.5% by weight, relative to the biodegradable resin composition. When the amount of the ultraviolet ray absorber is less than this range, there is a tendency that the effect of the ultraviolet ray absorber is lowered. In addition, when the amount of the ultraviolet ray absorber exceeds this range, there is a tendency that the production cost becomes excessively high, the heat resistance of the biodegradable resin composition is inferior, or bleed-out of the ultraviolet ray absorber is caused.

Examples of a heat stabilizer include hindered phenol-based heat stabilizers such as dibutylhydroxytoluene (BHT; 2,6-di-t-butyl-4-methylphenol), 2,2'-methylenebis(4-methyl-6t-butylphenol), pentaerythritol tetrakis[3-(3,5-di-tert-butyl-4-hydroxyphenyl)propionate], 3,3',3",5,5',5"-hexa-tert-butyl-a,a',a"-(mesitylene-2,4,6-triyl)tri-p-cresol, octadecyl-3-(3,5di-tert-butyl-4-hydroxyphenyl)propionate, 1,3,5-tris[(4-tert-butyl-3-hydroxy-2,6-xylyl)methyl]-1,3,5-triazine-2,4,6(1H,3H,5H)-trione, 1,3,5-tris(3,5-di-tert-butyl-4-hydroxybenzyl)-1,3,5-triazine-2,4,6(1H,3H,5H)-trione, calcium diethylbis[[3,5-bis(1,1-dimethylethyl)-4-hydroxyphenyl]methyl]phosphonate, bis(2,2'-dihydroxy-3,3'-di-tert-butyl-5,5'--dimethylphenyl)ethane, N,N'-hexane-1,6-diylbis[3-(3,5-di-tert-butyl-4-hydroxyphenyl propionamide, etc.; phosphorus-based heat stabilizers such as tridecyl phosphite, diphenyldecyl phosphite, tetrakis(2,4-di-tert-butylphenyl)[1,1-biphenyl]-4,4'-diyl bisphosphonite, bis[2,4-bis(1,1-dimethylethyl)-6-methylphenyl]ethyl ester phosphorous acid, bis(2,4-di-tert-butylphenyl)pentaerythritol diphosphite, etc.; lactone-based heat stabilizers such as a reaction product between 3-hydroxy-5,7-di-tert-butyl-furan-2-one and xylene, etc.; sulfur-based antioxidants such as dilauryl thiodipropionate, distearyl thiodipropionate, etc.; and the like.

The amount of the heat stabilizer to be mixed is generally 100 ppm or more, and preferably 200 ppm or more on a weight basis, and generally not more than 5 parts by weight, preferably not more than 1 part by weight, and more preferably not more than 0.5 parts by weight, relative to the biodegradable resin composition. When the amount of the heat stabilizer is less than this range, there is a tendency that the effect of the heat stabilizer is lowered. On the other hand, when the amount of the heat stabilizer exceeds this range, there is a tendency that the production cost becomes high, and there is a possibility that bleed-out of the heat stabilizer is caused.

Examples of a terminal-blocking agent which is used for the purpose of suppressing hydrolysis to be caused chiefly by moisture in the air, or the like include carbodiimide compounds, epoxy compounds, oxazoline compounds, and the like. As monocarbodiimide compounds among the above-described carbodiimide compounds, there can be exemplified dicyclohexyl carbodiimide, diisopropyl carbodiimide, dimethyl carbodiimide, diisobutyl carbodiimide, dioctyl carbodiimide, t-butylisopropyl carbodiimide, diphenyl carbodiimide, di-t-butyl carbodiimide, di-β-naphthyl carbodiimide, and the like. Of these, dicyclohexyl carbodiimide or diisopropyl carbodiimide is preferable because of easiness of industrial availability.

In addition, as polycarbodiimide compounds, those which are produced by methods described in, for example, U.S. Pat. No. 2,941,956, JP-B-47-33279, *J. Org. Chem., Vol.* 28, pp. 2069-2075 (1963), *Chemical Review* 1981, Vol. 81, No. 4, pp. 619-621, etc. can be used.

As an organic diisocyanate that is a raw material for producing the polycarbodiimide compound, for example, there can be exemplified aromatic diisocyanates, aliphatic diisocyanates, alicyclic diisocyanates, and mixtures thereof. Specifically, there can be exemplified 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl diisocyanate, 1,3,5-triisopropyl-bezene-2,4-diisocyanate, and the like.

As a carbodiimidation catalyst which is used for a decarboxylation condensation reaction of the organic diisocyanate, organic phosphorus-based compounds and organometallic compounds represented by the general formula: $M(OR)_n$ (wherein M represents a metal atom such as titanium, sodium, potassium, vanadium, tungsten, hafnium, zirconium, lead, manganese, nickel, calcium, barium, etc.; R represents an alkyl group having the carbon atom number of from 1 to 20 or an aryl group having the carbon atom number of from 6 to 20; and n represents an atomic valency which the metal atom M may take) are suitable. Above all, the organic phosphorus-based compound is preferably a phosphorene oxide, and the organometallic compound is preferably an alkoxide of titanium, hafnium, or zirconium because of high activity.

As specific examples of the phosphorene oxide, there can be exemplified 3-methyl-1-phenyl-2-phosphorene-1-oxide, 3-methyl-1-ethyl-2-phosphorene-1-oxide, 1,3-dimethyl-2-phosphorene-1-oxide, 1-phenyl-2-phosphorene-1-oxide, 1-ethyl-2-phosphorene-1-oxide, 1-methyl-2-phosphorene-1-oxide, and double bond isomers thereof. Above all, 3-methyl-1-phenyl-2-phosphorene-1-oxide is especially preferable because of easiness of industrial availability.

At the time of synthesis of such a polycarbodiimide compound, the degree of polymerization can also be controlled to a desired level by using a monoisocyanate or other active hydrogen-containing compound capable of reacting with the terminal isocyanate group. As the compound which is used for such a purpose, there can be exemplified monoisocyanate compounds such as phenyl isocyanate, tolyl isocyanate, dimethylphenyl isocyanate, cyclohexyl isocyanate, butyl isocyanate, naphthyl isocyanate, etc.; hydroxyl group-containing compounds such as methanol, ethanol, phenol, cyclohexanol, N-methylethanolamine, polyethylene glycol monomethyl ether, polypropylene glycol monomethyl ether, etc.; amino group-containing compounds such as diethylamine, dicyclohexylamine, β-naphthylamine, cyclohexylamine, etc.; carboxyl group-containing compounds such as succinic acid, benzoic acid, cyclohexanoic acid, etc.; mercapto group-containing compounds such as ethyl mercaptan, allyl mercaptan, thiophenol, etc.; various epoxy group-containing compounds; and the like.

These carbodiimide compounds may be used solely, or may also be used in admixture of two or more kinds thereof. In the present invention, in particular, it is preferable to use a polycarbodiimide compound. As for its degree of polymerization, a lower limit thereof is 2 or more, and preferably 4 or more, and an upper limit thereof is generally not more than 40, and preferably not more than 20. The use amount of such a carbodiimide is generally from 0.1 to 5% by weight relative to the whole of the resin composition.

Besides, the resin composition may contain a known surface wettability improving agent, flame retarder, release agent, combustion aid, pigment, dispersing agent, surfactant, hydrolysis inhibitor, terminal-blocking agent, crystal nucleating agent, or compatibilizer, or the like.

In the light of the above, the resin composition according to the present invention is one containing the polyester resin (A), the polyester resin (B), and the polyester resin (C), which is characterized in that not only the amount of the succinic acid-originated structural unit in the polyester resin (A) is allowed to fall within a prescribed range but a blending ratio of the resins (A) to (C) is allowed to fall within a prescribed range. When a film is formed by the resin composition having such a characteristic feature, the film has enhanced tear strength and has excellent impact strength. When the film obtained from the resin composition according to the present invention is formed into a bag, a bag in which not only tear by tearing is hardly caused, but tear by an impact is hardly caused can be produced. Alternatively, it is also suitable to use the resin composition according to the present invention as a material of mulch films for agricultural use or the like.

2. Production Method of Resin Composition

As a production method of the resin composition according to the present invention, a known technique can be adopted. Examples thereof include a method in which blended raw material chips of the polyester resin (A), the polyester resin (B), and the polyester resin (C) are melt mixed in the same extruder; a method in which the respective polyester resins are melted in separate extruders and then mixed; and the like. As the extruder, a single-screw extruder or a twin-screw extruder can be utilized. In addition, it is also possible to add and blend other components in a material obtained by mixing the polyester resins (A) to (C) and heat melting the mixture. On that occasion, for the purpose of uniformly dispersing other components, an oil for blending or the like can also be used. On the other hand, it is also possible to feed the respective raw material chips according to the polyester resins (A) to (C) directly into a forming machine to prepare a resin composition and at the same time, to obtain a molded material such as a film, etc. as it is.

3. Film

The resin composition according to the present invention can be formed in a film shape by various forming methods which are adopted for general-purpose plastics. As for the forming method, in particular, when the film is formed by means of extrusion forming or blown film forming, the effects of the present invention are remarkably revealed. More specifically, examples thereof include a method in which a film-shaped, sheet-shaped or cylindrical material having been extruded in a prescribed thickness from a T-die, an I-die, a round die, or the like is cooled for solidification by a cooling roll, water, compressed air, etc.; and the like. On that occasion, it is also possible to form a laminated film by laminating several kinds of compositions so long as the effects of the present invention are not impaired.

The thus obtained film-shaped formed material may be then uniaxially or biaxially stretched by a roll method, a tenter method, a tubular method, or the like. In the case of performing stretching, the stretching is generally performed at a stretching temperature ranging from 30° C. to 110° C. in a stretch ratio ranging from 0.6 to 10 times in the machine and transverse directions, respectively. In addition, after stretching, a heat treatment may be applied by a method of blowing hot air, a method of irradiating infrared rays, a method of irradiating microwaves, a method of contacting on a heat roll, or the like.

4. Mulch Film

It is more preferable that the resin composition according to the present invention is formed into a mulch film for agricultural use or the like. As for forming of a mulch film, the above-described known methods may be adopted. The mulch film obtained by forming the resin composition according to the present invention brings about the following effects. As for mulch films, it may be said that those which are excellent in terms of tear strength are suitably used. At this point, the mulch film obtained by forming the resin composition according to the present invention is enhanced in terms of tear strength and is also excellent in terms of impact strength. Accordingly, in the laid mulch film, it is possible to suppress occurrence of the matter that the film tears, whereby a defective portion becomes large. In addition, it is possible to prevent tear of the mulch film by an impact from occurring.

Incidentally, since the resin composition according to the present invention contains, as major components, the components inclusive of the aliphatic polyester-based resin, the aromatic-aliphatic copolyester-based resin, and the polyester resin containing the aliphatic oxycarboxylic acid, even when after the mulch film is used, it is buried in the group, there is not produced any problem.

5. Bag

The thus obtained film may be formed into a bag. As for forming of a bag, known methods can be adopted. For example, it is possible to form a bag by heat sealing an end of a cylindrical blown film. Here, as described above, the film constituting a bag is enhanced in terms of tear strength and also has excellent impact strength. When the film is excellent in terms of tear strength, it becomes possible to prevent vertical tear of the bag from occurring. In addition, in the view of the fact that the impact strength is excellent, on the occasion of opening the bag or filling the bag with goods, it becomes possible to prevent tear of the bag from occurring.

EXAMPLES

The present invention is hereunder described in more detail by reference to the following Examples and Comparative Examples. Incidentally, the following Examples are those for describing the present invention in detail, and it should not be construed that the present invention is limited to the following Example so long as the gist thereof is not deviated.

<Evaluation of Physical Properties>

Measurement of MFR Value

An MFR value was measured at 190° C. and a load of 2.16 kg using a melt indexer on the basis of JIS K7210 (1990).

Measurement of $^1$H-NMR

In the measurement of $^1$H-NMR, about 30 mg of a sample was weighed into an NMR sample tube having an outer diameter of 5 mm and added to and dissolved in 0.75 mL of deuteronchloroform. Thereafter, the solution was measured for a $^1$H-NMR spectrum at room temperature using a Bruker's AVANCE400 spectrophotometer. As for a standard of a chemical shift, tetramethylsilane (TMS) was defined to be 0.00 ppm.

Measurement of Melting Point

In measuring a melting point, 10 mg of a sample was heat melted under a nitrogen gas stream at a flow rate of 50 mL/min using a differential scanning calorimeter (a trade name: DSC7, manufactured by Perkin Elmer Inc.), and thereafter, the sample was cooled at a rate of 10° C./min and subsequently subjected to temperature elevation at a rate of 10° C./min. A melting peak temperature on that occasion was used as the melting point.

Production Example 1

[Preparation of Polycondensation Catalyst]

In a stirrer-equipped glass-made eggplant type flask, 100 parts by weight of magnesium acetate tetrahydrate was charged, and 400 parts by weight of absolute ethanol (purity: 99% by weight or more) was further added thereto. Furthermore, 65.3 parts by weight of ethyl acid phosphate (mixing weight ratio of monoester material and diester material: 45/55), and the mixture was stirred at 23° C. After elapsing 15 minutes, the magnesium acetate was confirmed to be completely dissolved, and thereafter, 122.2 parts by weight of tetra-n-butyl titanate was added. Furthermore, stirring was continued for 10 minutes to obtain a uniform mixed solution. This mixed solution was transferred into an eggplant type flask and concentrated under reduced pressure using an evaporator at 60° C. in an oil bath. After elapsing one hour, almost all of the ethanol was distilled off, and a semi-transparent viscous liquid remained. The temperature of the oil bath was further elevated to 80° C., and concentration was further performed under a reduced pressure of 5 Torr. The viscous liquid changed from the surface to a powder state step by step, and after elapsing 2 hours, the resultant was completely powdered. Furthermore, the powdered catalyst was dissolved in 1,4-butanediol and prepared so as to contain 10,000 ppm of a titanium atom.

[Production of Aliphatic Polyester-Based Resin]

In a reaction vessel equipped with a stirrer, a nitrogen inlet, a heating device, a thermometer, and an exhaust port for pressure reduction, 100 parts by weight of succinic acid, 99.2 parts by weight of 1,4-butanediol, and 0.24 parts by weight of malic acid were charged as raw materials, and the inside of the system was rendered into a nitrogen atmosphere by means of nitrogen-pressure reduction displacement.

Subsequently, the temperature was elevated to 230° C. over one hour while stirring the inside of the system, and a reaction was performed at this temperature for one hour. Thereafter, the above-described catalyst solution was added. The addition amount was regulated to be an amount of 50 ppm in terms of a titanium atom per the resulting polyester resin. The temperature was elevated to 250° C. over 30 minutes, and at the same time, the pressure was reduced to 0.06×10$^3$ Pa over 1 hour and 30 minutes. The reaction was further performed under a reduced pressure of 0.06×10$^3$ Pa for 4.2 hours, thereby obtaining a polyester resin. This polyester resin is hereunder sometimes also referred to as "Resin 1".

The resulting polyester resin had a melting point of 114° C. and an MFR value of 4.4 g/10 min, and its succinic acid unit in the dicarboxylic acid unit constituting the aliphatic polyester-based resin was 100% by mole.

Production Example 2

In a reaction vessel equipped with a stirrer, a nitrogen inlet, a heating device, a thermometer, and an exhaust port for pressure reduction, 100 parts by weight of succinic acid, 32.2 parts by weight of adipic acid, 111 parts by weight of 1,4-butanediol, 0.31 parts by weight of DL-malic acid, and 7.0 parts by weight of a 90% DL-lactic acid aqueous solution having 1% by weight of germanium oxide previously dissolved therein were charged as raw materials. A nitrogen gas was introduced with stirring the contents of the vessel, a reaction was started from 120° C. under a nitrogen gas atmosphere, and the temperature was elevated to 200° C. over 1 hour and 40 minutes. Subsequently, the temperature was elevated to 230° C. over 1 hour and 25 minutes, and at the same time, the pressure was reduced to 1 mmHg (133 Pa). Polymerization was performed at 230° C. and 1 mmHg (133 Pa) for 4 hours, thereby obtaining a polyester resin. This polyester resin is hereunder sometimes also referred to as "Resin 2".

The resulting polyester resin had a melting point of 88° C. and an MFR value of 4.2 g/10 min, and its succinic acid unit in the dicarboxylic acid unit constituting the polyester resin was 79% by mole.

Production Example 3

A polyester resin was obtained by performing polymerization in the same manner as that in Production Example 1, except that in Production Example 1, 100 parts by weight of succinic acid, 31.0 parts by weight of adipic acid, 143 parts by weight of 1,4-butanediol, and 0.345 parts by weight of malic acid were used. This polyester resin is hereunder sometimes also referred to as "Resin 3".

The resulting polyester resin had a melting point of 91° C. and an MFR value of 3.7 g/10 min, and its succinic acid unit in the dicarboxylic acid unit constituting the polyester resin was 80% by mole.

Production Example 4

A polyester resin was obtained by performing polymerization in the same manner as that in Production Example 1, except that in Production Example 1, 100 parts by weight of succinic acid, 43.6 parts by weight of adipic acid, 155 parts by weight of 1,4-butanediol, and 0.382 parts by weight of malic acid were used. This polyester resin is hereunder sometimes also referred to as "Resin 4".

The resulting polyester-based resin (Resin 4) had a melting point of 83.8° C. and an MFR value of 3.2 g/10 min, and its succinic acid unit in the dicarboxylic acid unit constituting the polyester resin was 74% by mole.

Production Example 5

100 parts by weight of succinic acid, 44.6 parts by weight of sebacic acid, 112 parts by weight of 1,4-butanediol, 0.472 parts by weight of malic acid, and 7.0 parts by weight of a 90% DL-lactic acid aqueous solution having 1% by weight of germanium oxide previously dissolved therein were charged in the same manner as that in Production Example 2. A nitrogen gas was introduced with stirring the contents of the vessel, a reaction was started from 160° C. under a nitrogen gas atmosphere, and the temperature was elevated to 220° C. over one hour, followed by keeping it for one hour. Thereafter, the temperature was elevated to 230° C. over 1 hour and 25 minutes, and at the same time, the pressure was reduced to 1 mmHg (133 Pa). Polymerization was performed at 230° C. and 1 mmHg (133 Pa) for 4 hours, thereby obtaining a polyester resin. This polyester resin is hereunder sometimes also referred to as "Resin 5". The resulting polyester resin (Resin 5) had a melting point of 87.8° C., and its succinic acid unit in the dicarboxylic acid unit constituting the polyester resin was 79% by mole.

Examples 1 to 23 and Comparative Examples 1 to 4

Each of the resins corresponding to the polyester resin (A) as produced in Production Examples 1 to 5 and the following Ecoflex as an aromatic-aliphatic copolyester-based resin, which is corresponding to the polyester resin (B), were blended using the following LACEA H-400 as a polyester resin composed of an aliphatic oxycarboxylic acid, which is corresponding to the polyester resin (C), and the following calcium carbonate as the filler (D) in a composition ratio shown in each of the following Tables 1 and 2 and kneaded at 200° C. by a twin-screw kneading machine (PCM30, manufactured by Ikegai Steel Co., Ltd.), and the kneaded mixture was inflation formed at 175° C. to fabricate a film having a thickness of 21 μm.
Ecoflex (polybutylene adipate-butylene terephthalate-based resin, manufactured by BASF, melting point: 120° C.)
LACEA H-400 (polylactic acid, manufactured by Mitsui Chemicals, Inc.)

Filler (D)
Filler 1: Calcium carbonate, NITREX 30P (manufactured by Nitto Funka Kogyo K.K., average particle diameter: 0.76 μm, specific gravity: 2.7, specific surface area: 30,000 cm$^2$/g, non-treated)
Filler 2: Calcium carbonate, NCC V2300 (manufactured by Nitto Funka Kogyo K.K., average particle diameter: 0.96 μm, specific gravity: 2.7, specific surface area: 23,000 cm$^2$/g, treated with a fatty acid and treated with an organic compound)
Filler 3: Calcium carbonate, NITREX 23PS (manufactured by Nitto Funka Kogyo K.K., average particle diameter: 0.96 μm, specific gravity: 2.7, specific surface area: 23,000 cm$^2$/g, treated with a fatty acid)
Filler 4: Calcium carbonate, NCC #1010 (manufactured by Nitto Funka Kogyo K.K., average particle diameter: 1.2 μm, specific gravity: 2.7, specific surface area: 19,000 cm$^2$/g, non-treated)
Filler 5: Calcium carbonate, NS #100 (manufactured by Nitto Funka Kogyo K.K., average particle diameter: 2.1 μm, specific gravity: 2.7, specific surface area: 10,500 cm$^2$/g, non-treated)

Each of the resulting films was evaluated in the following methods.

<Elmendorf Tear Strength>
The tear strength in the film flow direction at the time of film forming was measured in conformity with JIS K7128-2 (1998).

<Punching Impact Strength>
The punching impact strength of the film having a diameter of 50 mm was measured using a film impact tester, manufactured by Toyo Seiki Seisakusho Ltd. in conformity with JIS P8134 (1998). Incidentally, the evaluation was performed while installing a hemispherical metal-made jig having a diameter of 25.4 mm in an end of the impact tester punching part.

<Evaluation of Formability>
By using a blown film forming machine with an extruder of 40 mm and a round die having a diameter of 60 mm, moldability (state of bubble and frost), mouth opening properties of the film, and surface appearance were evaluated in a blow ratio of 2.5 mm, a thickness of 20 microns, and a discharge amount of 8 kg/h and at a constant air blow.

[Evaluation Criteria of Moldability]
A: The state where the frost line is low, so that the moldability is good.
B: The state where the frost line is somewhat high, but there is no problem in terms of moldability.
C: The state where the bubble is not stable, so that molding cannot be performed.

[Evaluation Criteria of Opening Properties]
A: The state where the film is opened without any resistance.
B: The state where the film is opened with some resistance.
C: The state where the film is hardly opened with resistance.

[Evaluation Criteria of Surface Appearance]
A: The state where the surface state is smooth and extremely good.
B: The state where though the surface is somewhat uneven, it is good.
C: The state where the surface is extremely uneven and rough.

The evaluation results are shown in the following Tables 1 and 2.

TABLE 1

Blending ratio of polyester resin and physical properties of polyester resin composition

| | Aliphatic polyester-based resin (A) | | | | | Aromatic-aliphatic polyester-based resin (B) Parts by weight | Aliphatic oxycarboxylic acid-based resin (C) Parts by weight | Succinic acid unit % by mole | B/(A + B) % by weight | C/(A + B + C) % by weight | Mechanical strength | |
|---|---|---|---|---|---|---|---|---|---|---|---|---|
| | Resin 1 Parts by weight | Resin 2 Parts by weight | Resin 3 Parts by weight | Resin 4 Parts by weight | Resin 5 Parts by weight | | | | | | Tear strength N/min | Impact strength [J/m] |
| Example 1 | | 70 | | | | 20 | 10 | 79.0 | 22.2 | 10 | 67.5 | $7.2 \times 10^4$ |
| Example 2 | | 60 | | | | 30 | 10 | 79.0 | 33.3 | 10 | 59.0 | $6.7 \times 10^4$ |
| Example 3 | | 50 | | | | 40 | 10 | 79.0 | 44.4 | 10 | 68.9 | $5.0 \times 10^4$ |
| Example 4 | | | | 60 | | 30 | 10 | 74.0 | 33.3 | 10 | 63.3 | $7.6 \times 10^4$ |
| Example 5 | | | | 50 | 20 | 20 | 10 | 75.4 | 22.2 | 10 | 68.0 | $7.1 \times 10^4$ |
| Example 6 | | | 55 | | | 30 | 15 | 80.0 | 35.3 | 15 | 17.1 | $3.6 \times 10^4$ |
| Example 7 | 10 | 60 | | | | 20 | 10 | 82.0 | 22.2 | 10 | 12.4 | $4.5 \times 10^4$ |
| Example 8 | | | 60 | | | 30 | 10 | 80.0 | 33.3 | 10 | 43.3 | $6.2 \times 10^4$ |
| Example 9 | | | | 70 | | 25 | 5 | 74.0 | 26.3 | 5 | 21.6 | $5.5 \times 10^4$ |
| Comparative Example 1 | 35 | 35 | | | | 10 | 20 | 90.0 | 12.5 | 20 | 5.1 | $1.9 \times 10^4$ |
| Comparative Example 2 | | 70 | | | | 30 | 0 | 79.0 | 30.0 | 0 | 7.7 | $2.7 \times 10^4$ |
| Comparative Example 3 | | | | 80 | | 0 | 20 | 74.0 | 0.0 | 20 | 5.5 | $2.9 \times 10^4$ |
| Comparative Example 4 | | | | 100 | | 0 | 0 | 74.0 | 0.0 | 0 | 4.5 | $1.3 \times 10^4$ |

In the foregoing table, the blank portion means that the subject material is not used.

TABLE 2

Blending ratio of polyester resin and filler and physical properties of polyester resin composition

| | Aliphatic polyester-based resin (A) | | Aromatic-aliphatic polyester-based resin (B) Parts by weight | Aliphatic oxycarboxylic acid-based resin (C) Parts by weight | Filler | | | | | Succinic acid unit % by mole | B/(A + B) % by weight | C/(A + B + C) % by weight |
|---|---|---|---|---|---|---|---|---|---|---|---|---|
| | Resin 1 Parts by weight | Resin 4 Parts by weight | | | 1 Parts by weight | 2 Parts by weight | 3 Parts by weight | 4 Parts by weight | 5 Parts by weight | | | |
| Example 10 | 21 | 49 | 20 | 10 | | | | | | 82 | 22.2 | 10 |
| Example 11 | | 70 | 20 | 10 | 10 | | | | | 74 | 22.2 | 10 |
| Example 12 | 7 | 63 | 20 | 10 | 20 | | | | | 77 | 22.2 | 10 |
| Example 13 | 14 | 56 | 20 | 10 | 20 | | | | | 79 | 22.2 | 10 |
| Example 14 | | 70 | 20 | 10 | | 10 | | | | 74 | 22.2 | 10 |
| Example 15 | | 70 | 20 | 10 | | 15 | | | | 74 | 22.2 | 10 |
| Example 16 | | 70 | 20 | 10 | | 20 | | | | 74 | 22.2 | 10 |
| Example 17 | | 70 | 20 | 10 | | 40 | | | | 74 | 22.2 | 10 |
| Example 18 | 7 | 63 | 20 | 10 | | 20 | | | | 77 | 22.2 | 10 |
| Example 19 | 14 | 56 | 20 | 10 | | 20 | | | | 79 | 22.2 | 10 |
| Example 20 | 7 | 63 | 20 | 10 | | | | 20 | | 77 | 22.2 | 10 |
| Example 21 | 7 | 63 | 20 | 10 | | | | | 20 | 77 | 22.2 | 10 |
| Example 22 | | 70 | 20 | 10 | | | | | 10 | 74 | 22.2 | 10 |
| Example 23 | 14 | 56 | 20 | 10 | | | | | 20 | 79 | 22.2 | 10 |

| | Mechanical strength | | Formability | | |
|---|---|---|---|---|---|
| | Tear strength N/mm | Impact strength [J/m] | Moldability | Mouth opening properties | Surface appearance |
| Example 10 | 10 | $8.77 \times 10^4$ | A | B | A |
| Example 11 | 76 | $7.90 \times 10^4$ | B | B | A |
| Example 12 | 80 | $3.00 \times 10^4$ | A | A | A |
| Example 13 | 63 | $3.12 \times 10^4$ | A | A | A |
| Example 14 | 64 | $8.55 \times 10^4$ | B | B | A |
| Example 15 | 63 | $6.50 \times 10^4$ | B | A | A |
| Example 16 | 71 | $5.11 \times 10^4$ | B | A | A |
| Example 17 | 38 | $3.07 \times 10^4$ | A | A | B |
| Example 18 | 32 | $5.85 \times 10^4$ | A | A | A |
| Example 19 | 24 | $5.82 \times 10^4$ | A | A | A |
| Example 20 | 47 | $3.40 \times 10^4$ | B | A | A |

TABLE 2-continued

Blending ratio of polyester resin and filler and physical properties of polyester resin composition

| | | | | | |
|---|---|---|---|---|---|
| Example 21 | 31 | $3.50 \times 10^4$ | A | A | A |
| Example 22 | 30 | $2.85 \times 10^4$ | B | A | B |
| Example 23 | 21 | $1.12 \times 10^4$ | A | A | B |

In the foregoing table, the blank portion means that the subject material is not used.

As is clear from Table 1, it is noted that in the films according to Examples 1 to 9, in view of the fact that all of the amount of the succinic acid-originated structural unit in the polyester-based resin (A) and the composition ratio of the polyester resin (A), the polyester-based resin (B), and the polyester resin (C) fall within the ranges specified in the present invention, these films are excellent in terms of mechanical strength so as to have a tear strength of 10 N/mm or more and an impact strength of $3.6 \times 10^4$ [J/m] or more. On the other hand, in all of the films according to Comparative Examples 1 to 4, the tear strength is less than 11 N/mm.

As is clear from Table 2, it is noted that the films according to Examples 10 to 23 are concerned with a composition in which all of the amount of the succinic acid-originated structural unit in the polyester-based resin (A) and the composition ratio of the polyester resin (A), the polyester-based resin (B), and the polyester resin (C) fall within the ranges specified in the present invention, and the filler is added, and these films have a tear strength of 20 N/mm or more and an impact strength of $1.1 \times 10^4$ [J/m] or more, are good in terms of moldability, mouth opening properties, and surface appearance, and are excellent in terms of mechanical strength and formability.

In the light of the above, the present invention has been described by referring to embodiments that are presently considered to be the most practical and preferable, but the present invention is not limited to the embodiments disclosed in the description, and appropriate changes may be made therein in a range not contradicting the gist or idea of the invention that is read from the claims and the entire description. It should be understood that a resin composition, a film, a mulch film, and a bag, which are accompanied with such changes, are included in the technical range of the present invention.

While the invention has been described in detail and with reference to specific embodiments thereof, it will be apparent to one skilled in the art that various changes and modifications can be made therein without departing from the spirit and scope thereof. This application is based on a Japanese patent application (Patent Application No. 2011-020820) filed on Feb. 2, 2011 and a Japanese patent application (Patent Application No. 2011-59398) filed on Jul. 20, 2011, the contents of which are incorporated herein by way of reference.

Industrial Applicability

The resin composition according to the present invention is one containing the polyester resin (A), the polyester resin (B), and the polyester resin (C), which is characterized in that not only the amount of the succinic acid-originated structural unit in the polyester resin (A) is allowed to fall within a prescribed range, but a blending ratio of the resins (A) to (C) is allowed to fall within a prescribed range. When a film is formed by the resin composition having such a characteristic feature, the film has enhanced tear strength and has excellent impact strength. When the film obtained from the resin composition according to the present invention is formed into a bag, the bag in which not only tear by tearing is hardly caused, but tear by an impact is hardly caused can be produced. Alternatively, it is also suitable to use the resin composition according to the present invention as a material of mulch films for agricultural use or the like

The invention claimed is:

1. A polyester resin composition, comprising:
   (A) a polyester resin that is an aliphatic polyester-based resin containing an aliphatic diol unit and an aliphatic dicarboxylic acid unit, the polyester resin (A) containing 5% by mole or more and not more than 86% by mole of a succinic acid unit in whole of the aliphatic dicarboxylic acid unit;
   (B) a polyester resin that is an aromatic-aliphatic copolyester-based resin containing an aliphatic diol unit, an aliphatic dicarboxylic acid unit, and an aromatic dicarboxylic acid unit, the polyester resin (B) containing 5% by mole or more and not more than 95% by mole of the aromatic dicarboxylic acid unit in all of dicarboxylic acid units; and
   (C) a polyester resin containing an aliphatic oxycarboxylic acid,
   wherein the polyester resin composition contains from 10 to 89% by weight of the polyester resin (A) and from 11 to 90% by weight of the polyester resin (B) relative to a total sum of the polyester resin (A) and the polyester resin (B), and
   the polyester resin composition contains from 1 to 40% by weight of the polyester resin (C) relative to a total sum of the polyester resin (A), the polyester resin (B), and the polyester resin (C).

2. The resin composition according to claim 1,
   wherein the aliphatic dicarboxylic acid unit constituting the polyester resin (A) contains an aliphatic dicarboxylic acid unit having a carbon number of 2 or more and not more than 40.

3. The resin composition according to claim 1, further comprising:
   a lubricant.

4. The resin composition according to claim 1, further comprising:
   a filler.

5. A film, which is obtained by subjecting the resin composition according to claim 1 to forming.

6. A mulch film, which is obtained by subjecting the resin composition according to claim 1 to forming.

7. A bag, which is obtained by subjecting the film according to claim 5 to forming.

* * * * *